United States Patent [19]
Horvath

[11] 3,744,635
[45] July 10, 1973

[54] PUMP FOR AQUARIUM FILTER TANKS

[76] Inventor: Tibor Horvath, 1877 East 27th Street, Brooklyn, N.Y. 11129

[22] Filed: Mar. 28, 1972

[21] Appl. No.: 238,799

[52] U.S. Cl.................. 210/169, 415/215, 417/424
[51] Int. Cl............................................... E04h 3/16
[58] Field of Search.................... 417/424; 415/215; 210/169

[56] References Cited
UNITED STATES PATENTS

| | | | |
|---|---|---|---|
| 2,194,037 | 3/1940 | Thuma | 210/169 |
| 2,515,538 | 7/1950 | Wall | 417/424 |
| 2,641,455 | 6/1953 | Poirot | 210/169 |
| 3,130,246 | 4/1964 | Banks | 417/424 |
| 3,225,930 | 12/1965 | Willinger | 417/424 |
| 3,295,681 | 1/1967 | Rubert et al. | 210/169 |
| 3,468,288 | 9/1969 | Cassil | 210/169 |
| 3,566,840 | 3/1971 | Willinger | 210/169 |
| 3,701,427 | 10/1972 | Howard | 210/169 |

*Primary Examiner*—C. J. Husar
*Attorney*—Peter L. Tailer

[57] ABSTRACT

An aquarium filter pump which draws water from below filter material in a filter tank and returns it to an aquarium has a vertical pump casing conforming to an elongated impeller having a smaller lower end and a larger upper end above the top of the filter tank, the smaller lower end priming the upper end for more efficient pumping action. The pump motor is mounted on top of the casing and has a shaft extending down into it on which the impeller is mounted. The upper end of the impeller is formed as an inverted conical boss containing blades which throw water away from the shaft entrance. The shaft entrance into the casing has an adjustable seal admitting air for selective aeration. The casing has relatively rotatable inner and outer casings closed at the top and open at the bottom with a clearance therebetween. The outlet tube on the outer casing slides over an outlet opening in the inner casing so that relative rotation of the casings directs selected proportions of pumped water through the outlet tube and between the casings for recirculation back into the filter tank.

10 Claims, 8 Drawing Figures

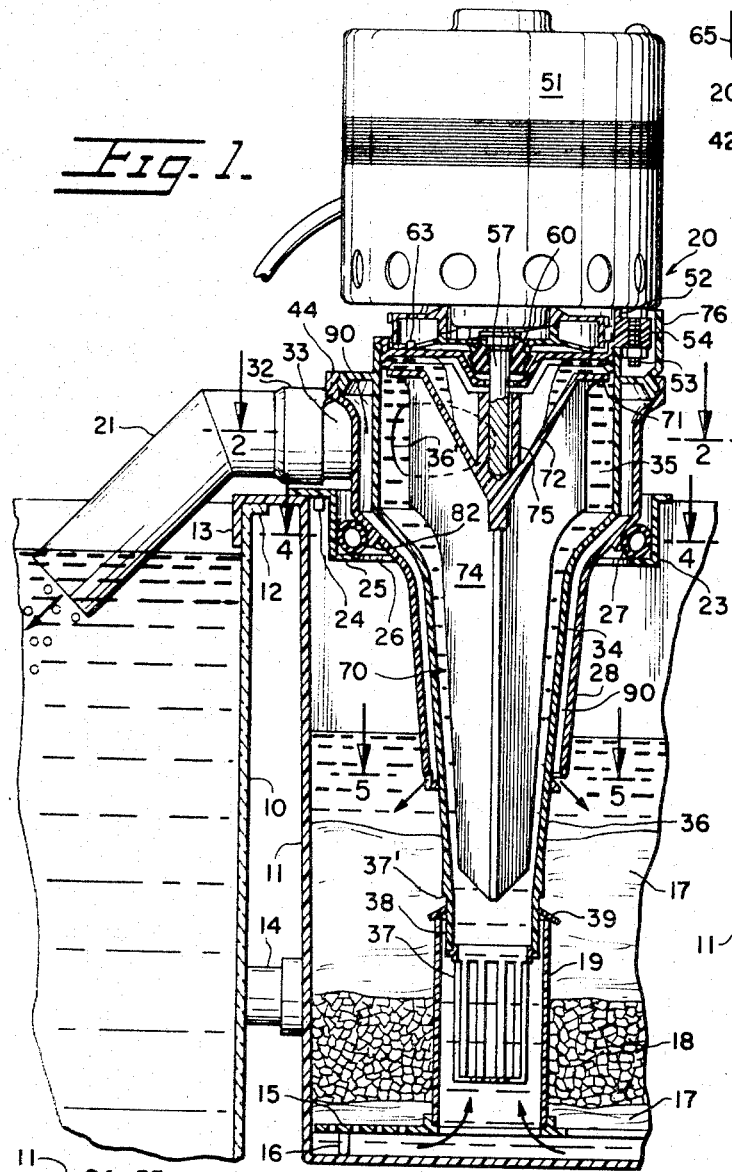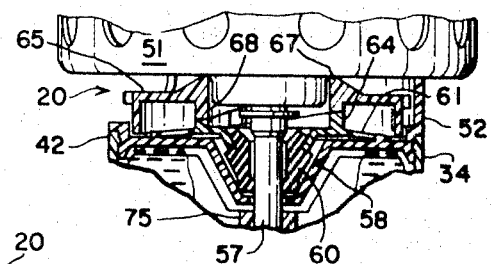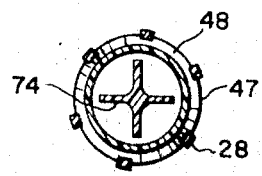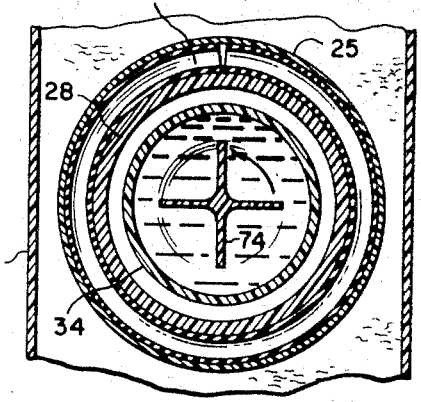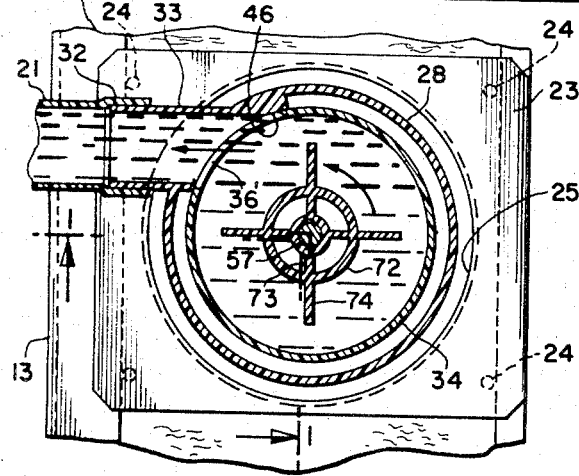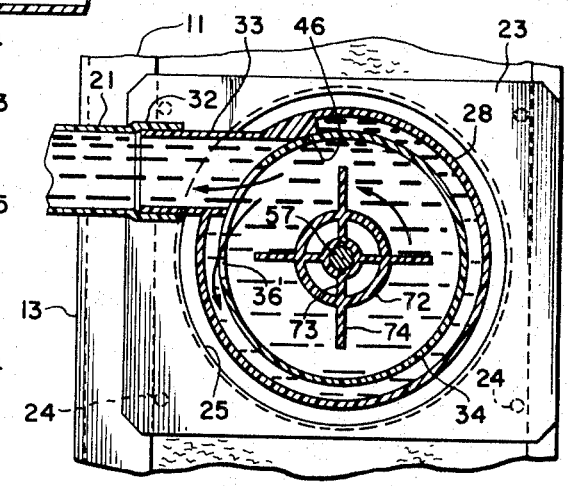

PUMP FOR AQUARIUM FILTER TANKS

There is a need for more efficient, quieter, larger capacity aquarium filter tank pumps which may be adjusted to be used in a wider range of aquarium tank sizes. This invention provides such a pump with many novel advantages.

FIG. 1 is a vertical section through a pump mounted in a filter tank fixed to a fragment of an aquarium tank, the section being taken on line 1—1 of FIG. 2.

FIG. 2 is a horizontal section taken on line 2—2 of FIG. 1.

FIG. 3 is a horizontal section taken on line 2—2 of FIG. 1 showing the pump adjusted for greater recirculation when used with a smaller aquarium tank.

FIG. 4 is a horizontal section taken on line 4—4 of FIG. 1.

FIG. 5 is a horizontal section taken on line 5—5 of FIG. 1.

FIG. 6 is a vertical section through a fragment of the top of the pump casing and the pump motor showing adjustment of the shaft seal to reduce aeration.

Figure 8:
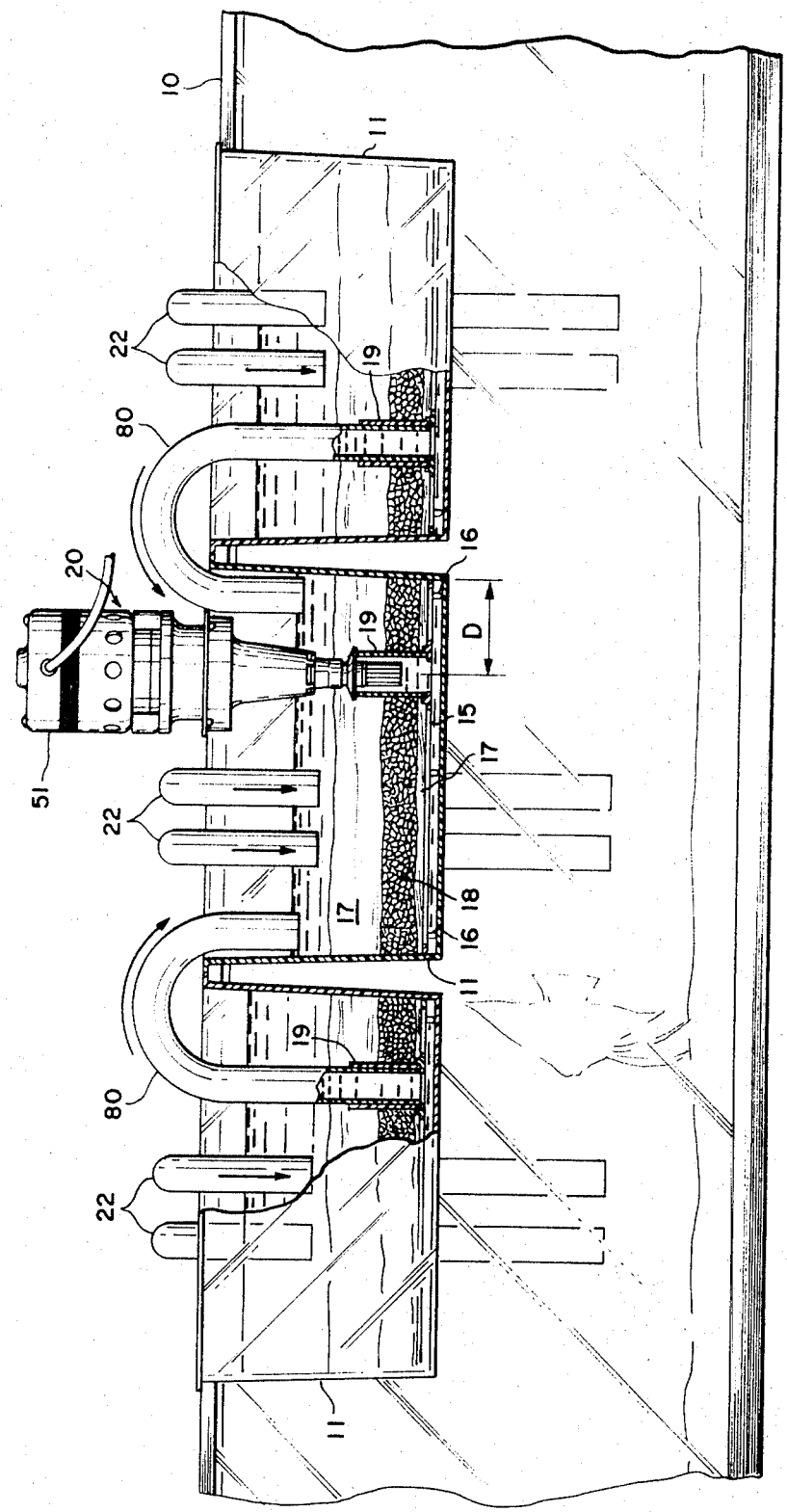
FIG. 8 is a side view of a fragment of a large aquarium tank showing a mode of operation of the pump of this invention.

As shown in FIG. 1, an aquarium tank 10 has a filter tank 11 fixed to its rim 12 by a hooked flange 13. A spacer 14 positions the bottom of filter tank 11. Within tank 11 is a perforated platform 15 spaced from the bottom of filter tank 11 by legs 16. Layers of glass wool 17, charcoal 18, or other filter material rest on perforated platform 15. A suction tube 19 extends upward from platform 15 through the filter material to have a pump 20 fixed over it. Pump 20 draws water from below platform 15 and passes it to aquarium 10 through outlet tube 21. One or more syphons 22, as shown in FIG. 8, return water from aquarium tank 10 to filter tank 11 so that water is continually drawn downward through the filter material. The above, as described, is conventional procedure.

The pump 20 of this invention is shown in detail in FIGS. 1-7. A bridge 23 extends across the top of filter tank 11 and is positioned by the integrally molded downward extending pins 24 as shown in FIGS. 1-4. A cylindrical downward extending cup 25 contains a central opening 26. A circular rubber tube 27 is disposed in cup 25 about opening 26 to receive and shock mount the tapered outer casing 28 of pump 20. An annular ridge 82 is formed on casing 28 to enter the circular tube 27. Rubber tubing 27 is used as solid rubber does not provide a sufficiently resilient mounting.

Figure 7:
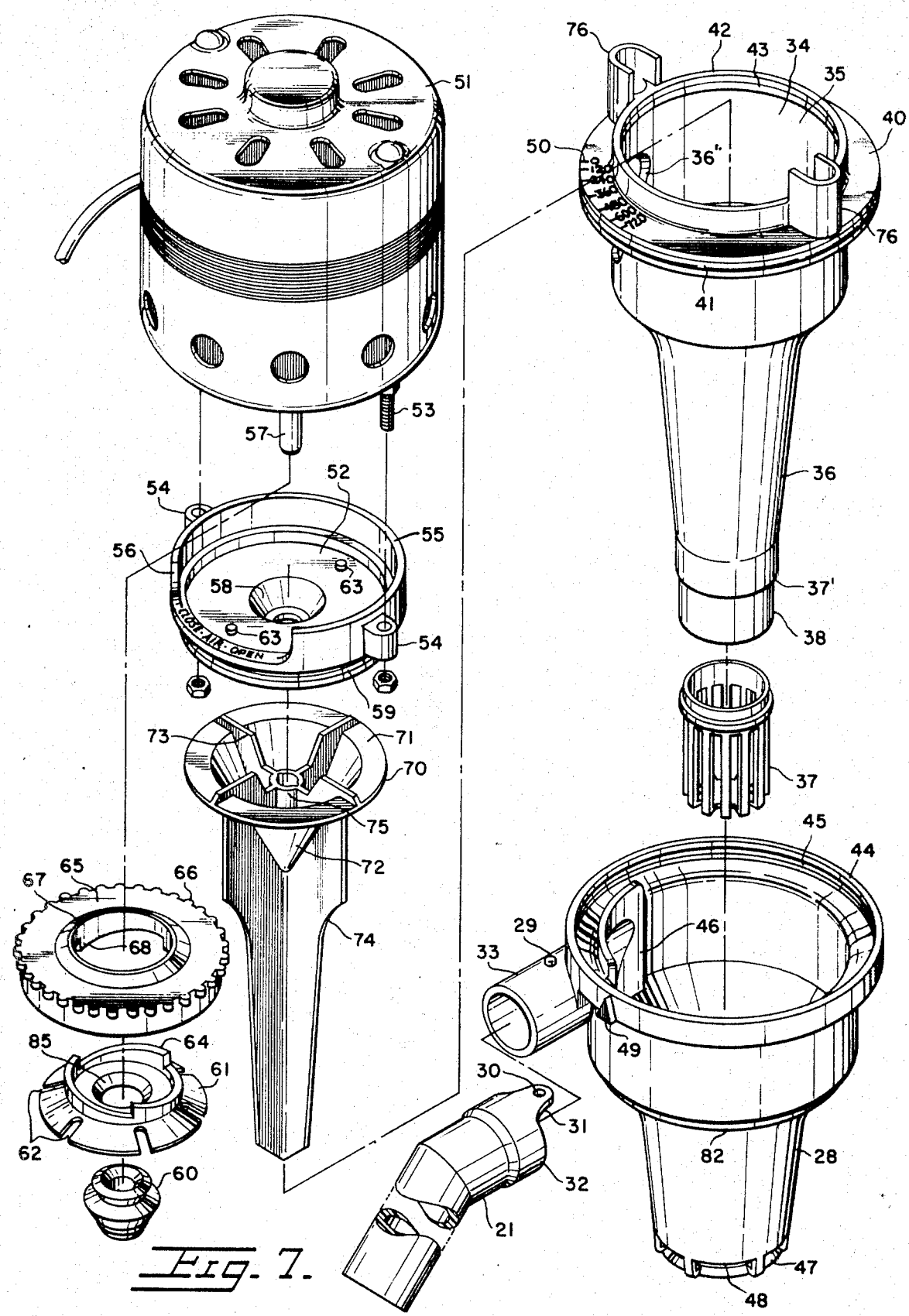
FIG. 7 is an exploded perspective view of the elements of the pump.

Pump 20, as most clearly shown in FIGS. 1 and 7, has an outer casing 28 from which there extends the shank 33 for the attachment of outlet tube 21. As will be explained, the great efficiency of this pump provides such a large volume flow that shank 33 should have a stud 29 formed thereon so that aperture 30 in extension 31 of collar 32 snaps over it. This locks outlet tube 21 to shank 33 so that it will not be blown off shank 33 at full pump capacity.

An inner casing 34 has a large cylindrical upper cavity 35 and it contains a tangential outlet opening 36'. Below cavity 35 inner casing 34 constricts inward to the tapering smaller diameter bottom portion 36. A screen cap 37 is pressed on the end of portion 36. Portion 36 has a downward facing outer shoulder 37' above a cylindrical end 38. As shown in FIG. 1, a washer 39 sliding on end 38 seals it to suction tube 19. An upper flange 40 of casing 34 has a central annular ridge 41. An annular rim 42 above flange 40 contains an annular bead 43.

Outer casing 28 conforms to inner casing 34 with a clearance 90 therebetween. An upper rim 44 contains an annular groove 45 into which ridge 41 of flange 40 snaps to rotatably join the casings 36 and 28. Shank 33 terminates inside outer casing 28 at a surface 46 which conforms to the outside of cavity 35 of inner casing 34. The bottom of casing 28 has an inturned flange 47 which positions casing 28 about casing 34. Flange 47 contains openings 48 to allow water to escape downward from between the casings 28 and 34. Openings 48 are best formed to direct water outward. As shown in FIGS. 2 and 3, relative rotation of the casings 28 and 34 moves the tangential outlet opening 36' from complete alignment with shank 33 to positions of partial alignment which allow portions of the water pumped to flow out shank 33 and portions of the water pumped to flow downward between the casings 34 and 28. An indicator 49 on casing 28 is aligned with gallons per hour markings 50 on top of flange 40 as shown in FIG. 7. These markings indicate the gallons per hour discharged by pump 20 through outlet tube 21 at a given setting made by relative rotation of the casings 34 and 28.

Motor 51 has a plate 52 fixed below it by bolts 53 passing through lugs 54 projecting from rim 55. The aquarium tank side of rim 55 is cut away at 56. Motor shaft 57 extends through an opening in a conical depression 58 in plate 52. Below rim 55 plate 52 has an annular groove 59 to receive bead 43 on rim 42 of inner casing 36.

A soft ruber seal 60, which may be of self-lubricated rubber, seats in conical depression 58. Compression member 61 has radial slots 62 which are engaged by lugs 63 of plate 62 to prevent rotation of member 61. Annular cam surfaces 64 with a saw tooth configuration project upward from member 61. A central opening 85 receives the top of seal 60. Aeration adjustment wheel 65 has finger grips 66 projecting from it. Wheel 65 fits within rim 55 of plate 52 and has an upper ring 67 which bears against the bottom of motor 51. Wheel 65 has downward extending annular cam surfaces 68 which engage the surfaces 64 of member 61. Thus finger rotation of wheel 65 compresses or releases rubber seal 60 to allow controlled amounts of air to enter cavity 35 of pump 20.

Impeller 70 has an upper rim 71 with a central downward facing conical boss 72. Within boss 72 are vanes 73 and a hub 75 to receive motor shaft 57. Below rim 71 impeller vanes 74 extend downward. The vanes 74 generally correspond in profile to the inner surface of inner casing 34.

Rotation of inner casing 34 relative to outer casing 28 is accomplished by grasping and turning motor 51. This would only turn plate 52 within rim 42 of casing 34 except that covers 76 extend about the lugs 54. This rotatably locks plate 52 to casing 34 so that the turning of motor 51 turns casing 34 within outer casing 28.

Referring particularly to FIG. 7, it may be seen that two part molds may make all parts of the pump except the inner casing 34 and the outer casing 28. If shank 33 and surface 46 are separately molded and glued in outer casing 28, the only cam action required will be to mold tangential outlet opening 36 and an aperture in casing 33 to receive shank 33. This greatly reduces tooling cost to produce this pump.

In operation, the pump 20 enjoys many advantages. First, the large diameter portion of the impeller 70 is disposed in the large cylindrical upper cavity 35 of casing 34. The lower portion of the impeller merely reaches to the level of the water in filter tank 11 to raise water to the cavity 35 where the main pumping action takes place. Thus the main pumping action is above the level of the water and at least partially above the top of tank 11. This allows shank 33 and outlet tube 21 to lead directly out of filter tank 11 with no sharp bends which greatly reduce flow. Thus construction also allows for the best positioning of tangential outlet opening 36 for maximum water flow from cavity 35. Pump 20 is so efficient that a 1/70 H.P. motor 51 delivered 720 gallons per hour in one pump that was built. This is seven times the rate of a 1/70 H.P. motor driven pump which has a completely submerged impeller and required sharp outlet tube bends.

The adjustable recirculation feature which is provided by the relative rotation of the casings 34 and 28 greatly improves filtration in smaller tanks where the full outlet capacity is not required. The reason for this improved filtration with recirculation is known as biological filtration. This requires a high volume of water circulation so that microorganisms clinging to the filter material absorb harmful toxic elements deposited by the fish in the aquarium water.

Pump 20, when set to discharge 100 gallons per hour through outlet 21, will recirculate about 600 gallons per hour within the filter tank 11 to pass each gallon discharged through the filter material about six times. In addition, water shooting back into the filter tank through openings 48 is agitated to break up solid particles into liquid and gas. Most gases will escape from the water and the liquid will be absorbed. Remaining solid matter will be filtered out. Thus the filter material 17 and 18 will not clog as fast as when a conventional low capacity pump is used. It should also be pointed out that reduction of flow from the outlet tube does not load the pump motor as would a conventional restricting valve because the recirculation feature does not restrict the total volume flow through the pump.

The setting of the aeration wheel 65 compresses seal 60 to different degrees. When it is uncompressed as shown in FIG. 1, seal 60 admits air below it to be sucked into chamber 35. Here vanes 73 and 74 beat the air into fine bubbles which enter tank 10 through inlet tube 21 to aerate it in a particularly efficient manner. After several weeks of operation as the filter materials 17 and 18 clog, too much air will be drawn into the pump which will then cause noise. This warns that the filter tank needs cleaning, however the tightening of wheel 65 will reduce aeration to a desired level if it is not desired to clean the tank. The use of the annular saw tooth cams 64 and 68 prevent the excessive tightening of seal 60 so that it grips shaft 57 as the height of the cams 64 and 68 limits the compression of seal 60.

The downward facing conical boss 72 in the center of rim 71 prevents any water from being forced through seal 60 during the initial surge of water on starting pump 20. By the time water flows outward along boss 72 and around the periphery of rim 71, it will have sufficient angular velocity so that centrifugal force will draw it away from seal 60 and shaft 57.

The shock mounting of pump 20 in the tubing ring 27 allows the pump to be rotated to discharge in any direction into tank 10.

As shown in FIG. 8, a single high capacity pump 20 can service three filter tanks 11. Additional tanks 11 have syphons 80 inserted in their suction tubes 19 to drain into the pump serviced tank 11. Additional syphons 22 drain aquarium tank 10 into the additional filter tanks 11. This method of operation for large tanks 10 allows the use of standardized filter tanks 11 and filters at least some of the water through more than one filter tank 11 which is an additional benefit. The suction tubes 19 must be located a minimum distance D from one end of the filter tanks 11 to allow a syphon 80 to extend into both ends of the pump filter tank 11.

While this invention has been shown and described in the best form known, it will nevertheless be understood that this is purely exemplary and that modifications may be made without departing from the spirit of the invention.

What is claimed is:

1. A pump for an aquarium filter tank, said filter tank having filter material, means supporting said filter material, and a suction outlet drawing from below said filter material, said pump comprising, in combination, a vertical casing containing a cylindrical cavity disposed at least partly above the top of said filter tank, a tangential outlet from said cylindrical cavity extending out over the top of said filter tank, said casing being smaller below said cavity and extending downward to connect with said suction outlet, a motor fixed on top of said casing and having a vertical shaft entering said casing, and an impeller on said shaft within said casing, said impeller having a large upper portion within said cavity and a smaller lower portion extending downward within said cavity below the level of water in said filter tank, said smaller lower portion priming said upper portion by raising water into said cavity where efficient pumping action takes place.

2. The combination according to claim 1 wherein said casing is constricted below said cavity and tapers downward thereafter, said impeller having an upper rim and a plurality of vertical lower vanes extending downward from said upper rim disposed at the top of said cavity.

3. The combination according to claim 1 wherein said impeller has an outward flaring central boss extending upward to said rim, said boss containing upper vanes and a central hub mounted on said shaft, said casing having a top plate containing an aperture through which said shaft extends entering said casing, said upper vanes throwing water away from said aperture in said top plate.

4. The combination according to claim 3 with the addition of a soft resilient seal disposed about said shaft above the opening in said top plate, and with the addition of means adjustably compressing said seal against said top plate.

5. The combination according to claim 4 wherein said means compressing said seal comprises a compression member containing an opening disposed over said top plate and an aeration wheel containing an opening disposed between said motor and said compression member, and means preventing rotation of said compression member, said aeration wheel and said compression member having interacting cams so that rotation of said aeration wheel forces said compression member against said seal adjustably compressing said seal, the compression of said seal regulating air flow past said seal into said casing.

6. The combination according to claim 1 with the addition of adjustable means associated with outlet directing a selected proportion of the water pumped through said outlet down into said filter tank.

7. The combination according to claim 1 wherein said casing is formed from inner and outer casings, said inner casing containing said impeller and having a tangential outlet aperture communicating with said cavity, said outer casing being disposed about said inner casing with a clearance therebetween, said inner and outer casings being rotatably joined and their upper ends and one of said casings containing apertures draining the bottom of said clearance, said outer casing having a tangential outlet tube terminating with an inner surface adjacent to the outlet aperture of said inner casing so that relative rotation of said casing moves said inner surface of said outlet tube relative to said outlet aperture to adjustably direct a portion of the water pumped through said outlet aperture into said clearance to return into said filter tank.

8. The combination according to claim 7 wherein one of said casings has an indicator formed thereon and the other of said casings has flow rate markings formed thereon, the relative rotation of said casings causing said indicator to indicate said flow markings according to the flow rate through said outlet tube.

9. The combination according to claim 1 wherein said tangential outlet comprises a shank, an outlet tube slipped over said shank, and means locking said outlet tube to said shank.

10. The combination according to claim 1 with the addition of a member extending across said filter tank, said member having a downward extending cup containing a large central opening, and a resilient tube disposed in said cup, said casing of said pump extending through the opening in said cup and resting on said tube, said tube shock mounting said pump and allowing the direction of said pump outlet to be changed.

* * * * *